United States Patent
Meissner et al.

(10) Patent No.: US 11,232,126 B2
(45) Date of Patent: Jan. 25, 2022

(54) ZERO DOWNTIME UPGRADE OF SYSTEMS WITH DATABASE-SIDE REPLICATION

(71) Applicant: SAP SE, Walldorf (DE)

(72) Inventors: Steffen Meissner, Heidelberg (DE); Volker Driesen, Heidelberg (DE); Tobias Karpstein, Eschelbronn (DE); Martin Mayer, Heidelberg (DE); Thomas Saelinger, Dielheim (DE); Thomas Ullrich, Stutensee (DE)

(73) Assignee: SAP SE, Walldorf (DE)

( * ) Notice: Subject to any disclaimer, the term of this patent is extended or adjusted under 35 U.S.C. 154(b) by 577 days.

(21) Appl. No.: 16/197,888

(22) Filed: Nov. 21, 2018

(65) Prior Publication Data
US 2020/0159852 A1    May 21, 2020

(51) Int. Cl.
*G06F 16/00*    (2019.01)
*G06F 16/27*    (2019.01)
*G06F 8/65*    (2018.01)
*G06F 16/21*    (2019.01)

(52) U.S. Cl.
CPC ............... *G06F 16/27* (2019.01); *G06F 8/65* (2013.01); *G06F 16/212* (2019.01)

(58) Field of Classification Search
CPC ...... G06F 16/212; G06F 16/214; G06F 16/27; G06F 8/65
See application file for complete search history.

(56) References Cited

U.S. PATENT DOCUMENTS

| | | | |
|---|---|---|---|
| 5,680,573 | A | 10/1997 | Rubin et al. |
| 5,925,100 | A | 7/1999 | Drewry et al. |
| 5,946,647 | A | 8/1999 | Miller et al. |
| 6,055,569 | A | 4/2000 | O'Brien et al. |
| 6,728,726 | B1 | 4/2004 | Bernstein et al. |
| 6,810,429 | B1 | 10/2004 | Walsh et al. |
| 6,996,680 | B2 | 2/2006 | Mogi et al. |

(Continued)

OTHER PUBLICATIONS

Herrmann, Kai; Living in Parallel Realities—Co-Existing Schema Versions with a Bidirectional Database Evolution Language, , May 2017, Chicago, IL, USA, pp. 1101-1116, 2017.*

(Continued)

*Primary Examiner* — Dinku W Gebresenbet
(74) *Attorney, Agent, or Firm* — Fish & Richardson P.C.

(57) ABSTRACT

Implementations include providing, by a deploy tool, clone data components in the first database system, each clone data component being a copy of a data component, defining, by the deploy tool, a source-side green access schema in the first database system, the green access schema providing views to the clone data components, providing, by a replication system and based on statements received from the deploy tool, consumer-side clone data components in the first database system, each consumer-side clone data component being a copy of a respective data component, defining, by a replication system and based on statements received from the deploy tool, a consumer-side green access schema in the first database system, the green access schema providing views to the source-side clone data components, and, during execution of the upgrade, replicating, by a handler of the replication system, data from at least one source-side data component to a consumer-side component.

20 Claims, 10 Drawing Sheets

(56) References Cited

U.S. PATENT DOCUMENTS

| | | |
|---|---|---|
| 7,284,096 B2 | 10/2007 | Schreter |
| 7,523,142 B2 | 4/2009 | Driesen et al. |
| 7,529,895 B2 | 5/2009 | Blumrich et al. |
| 7,558,822 B2 | 7/2009 | Fredricksen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,941,609 B2 | 5/2011 | Almog |
| 7,962,920 B2 | 6/2011 | Gabriel et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,275,829 B2 | 9/2012 | Plamondon |
| 8,291,038 B2 | 10/2012 | Driesen |
| 8,301,610 B2 | 10/2012 | Driesen et al. |
| 8,326,830 B2 | 12/2012 | Hollingsworth |
| 8,356,010 B2 | 1/2013 | Driesen |
| 8,375,130 B2 | 2/2013 | Eberlein et al. |
| 8,380,667 B2 | 2/2013 | Driesen |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,392,573 B2 | 5/2013 | Lehr et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,510,710 B2 | 8/2013 | Harren et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,577,960 B2 | 11/2013 | Boiler et al. |
| 8,600,916 B2 | 12/2013 | Chen et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,525 B2 | 5/2015 | Harren et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,436,724 B2 | 9/2016 | Driesen et al. |
| 2004/0117398 A1 | 6/2004 | Idei et al. |
| 2006/0069715 A1 | 3/2006 | Vayssiere |
| 2006/0098253 A1 | 5/2006 | Masuno et al. |
| 2009/0210866 A1 | 8/2009 | Troan et al. |
| 2009/0288079 A1 | 11/2009 | Zuber et al. |
| 2009/0300597 A1 | 12/2009 | George et al. |
| 2010/0023925 A1 | 1/2010 | Shribman et al. |
| 2010/0153341 A1 | 6/2010 | Driesen et al. |
| 2011/0252415 A1 | 10/2011 | Ricci et al. |
| 2012/0089664 A1 | 4/2012 | Igelka |
| 2012/0233605 A1 | 9/2012 | Lupu et al. |
| 2012/0284080 A1 | 11/2012 | Oliveira et al. |
| 2013/0007259 A1 | 1/2013 | Pacheco-Sanchez et al. |
| 2013/0167079 A1 | 6/2013 | Ari et al. |
| 2014/0258999 A1 | 9/2014 | Kathar et al. |
| 2014/0325498 A1 | 10/2014 | Sirois et al. |
| 2014/0359594 A1 | 12/2014 | Erbe et al. |
| 2015/0106140 A1* | 4/2015 | Biewald ............... G06Q 10/06 705/7.12 |
| 2015/0193224 A1 | 7/2015 | Ziat et al. |
| 2016/0085542 A1 | 3/2016 | Meissner et al. |
| 2016/0098267 A1 | 4/2016 | Meissner et al. |
| 2016/0098438 A1 | 4/2016 | Eberlein et al. |
| 2016/0098443 A1 | 4/2016 | Specht et al. |
| 2016/0162275 A1 | 6/2016 | Morley et al. |
| 2017/0116296 A1 | 4/2017 | Specht et al. |
| 2017/0123787 A1 | 5/2017 | Burkhardt et al. |
| 2017/0161291 A1 | 6/2017 | Specht et al. |
| 2017/0185392 A1 | 6/2017 | Konrad et al. |
| 2017/0344362 A1 | 11/2017 | Burkhardt et al. |
| 2018/0039494 A1* | 2/2018 | Lander ............... H04L 63/0815 |
| 2018/0232382 A1 | 8/2018 | Mayer et al. |

OTHER PUBLICATIONS

U.S. Appl. No. 14/960,983, filed Dec. 7, 2015, Eberlein, et al.
U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/167,746, filed May 27, 2016, Burkhardt et al.
U.S. Appl. No. 15/285,715, filed Oct. 5, 2016, Specht et al.
U.S. Appl. No. 15/285,745, filed Oct. 5, 2016, Mayer.
U.S. Appl. No. 15/461,236, filed Mar. 16, 2017, Richter et al.

* cited by examiner

ZERO DOWNTIME UPGRADE OF SYSTEMS WITH DATABASE-SIDE REPLICATION

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases provided in one or more database systems.

During a lifecycle of the application and/or database, one or more maintenance operations may be required. Example maintenance operations include upgrading, patching and testing. In order to perform such maintenance procedures, the application, and/or database may be taken offline, such that users are unable to interact with the application and/or database. This is referred to as downtime. Although software providers have strived minimize downtime, achieving zero downtime during such maintenance procedures has been an elusive goal. Further, some maintenance procedures have required, for example, copying of data to separate databases, which can require additional resources (e.g., computer processing, memory).

SUMMARY

Implementations of the present disclosure are directed to minimizing downtime during upgrade of an application. More particularly, implementations of the present disclosure are directed to minimizing downtime during upgrade of an application in systems with database-side replication.

In some implementations, actions include providing, by a deploy tool, one or more source-side clone data components in the first database system, each source-side clone data component being a copy of a respective data component, defining, by the deploy tool, a source-side green access schema in the first database system, the source-side green access schema providing one or more views to the one or more source-side clone data components, providing, by a replication system and based on one or more statements received from the deploy tool, one or more consumer-side clone data components in the first database system, each consumer-side clone data component being a copy of a respective data component, defining, by a replication system and based on one or more statements received from the deploy tool, a consumer-side green access schema in the first database system, the consumer-side green access schema providing one or more views to the one or more source-side clone data components, and, during execution of the upgrade, replicating, by a handler of the replication system, data from at least one source-side data component to a respective consumer-side component. Other implementations of this aspect include corresponding systems, apparatus, and computer programs, configured to perform the actions of the methods, encoded on computer storage devices.

These and other implementations can each optionally include one or more of the following features: actions further include, after completion of the upgrade, switching an upgraded version of the application to the source-side green access schema for interacting with the one or more source-side clone data components, and removing a source-side blue access schema, through which a previous version of the application accessed data in the first database system; actions further include, after completion of the upgrade, switching replication of data from the first database system to the consumer-side green access schema, and removing a consumer-side blue access schema, through which data was replicated to in the second database system; the replication system triggers switching of replication of data, and removing the consumer-side blue access schema based on post-upgrade statements received from the deploy tool; the source-side green access schema includes a replication trigger for replicating data to the second database system; a data schema of the first database system includes a trigger for copying data from an original clone data component to at least one source-side data component; and the one or more source-side data components include one or more of a clone column, and a clone table.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to minimizing downtime during upgrade of an application. More particularly, implementations of the present disclosure are directed to minimizing downtime during upgrade of an application in systems with database-side replication. Implementations can include actions of providing, by a deploy tool, one or more source-side clone data components in the first database system, each source-side clone data component being a copy of a respective data component, defining, by the deploy tool, a source-side green access schema in the first database system, the source-side green access schema providing one or more views to the one or more source-side clone data components, providing, by a replication system and based on one or more statements received from the deploy tool, one or more consumer-side clone data components in the first database system, each consumer-side clone data component being a copy of a respective data component, defining, by a replication system and based on one or more statements received from the deploy tool, a consumer-side green access schema in the first database system, the consumer-side green access schema providing one or more views to the one or more source-side clone data components, and, during execution of the upgrade, replicating, by a handler of the replication system, data from at least one source-side data component to a respective consumer-side component.

Figure 1:
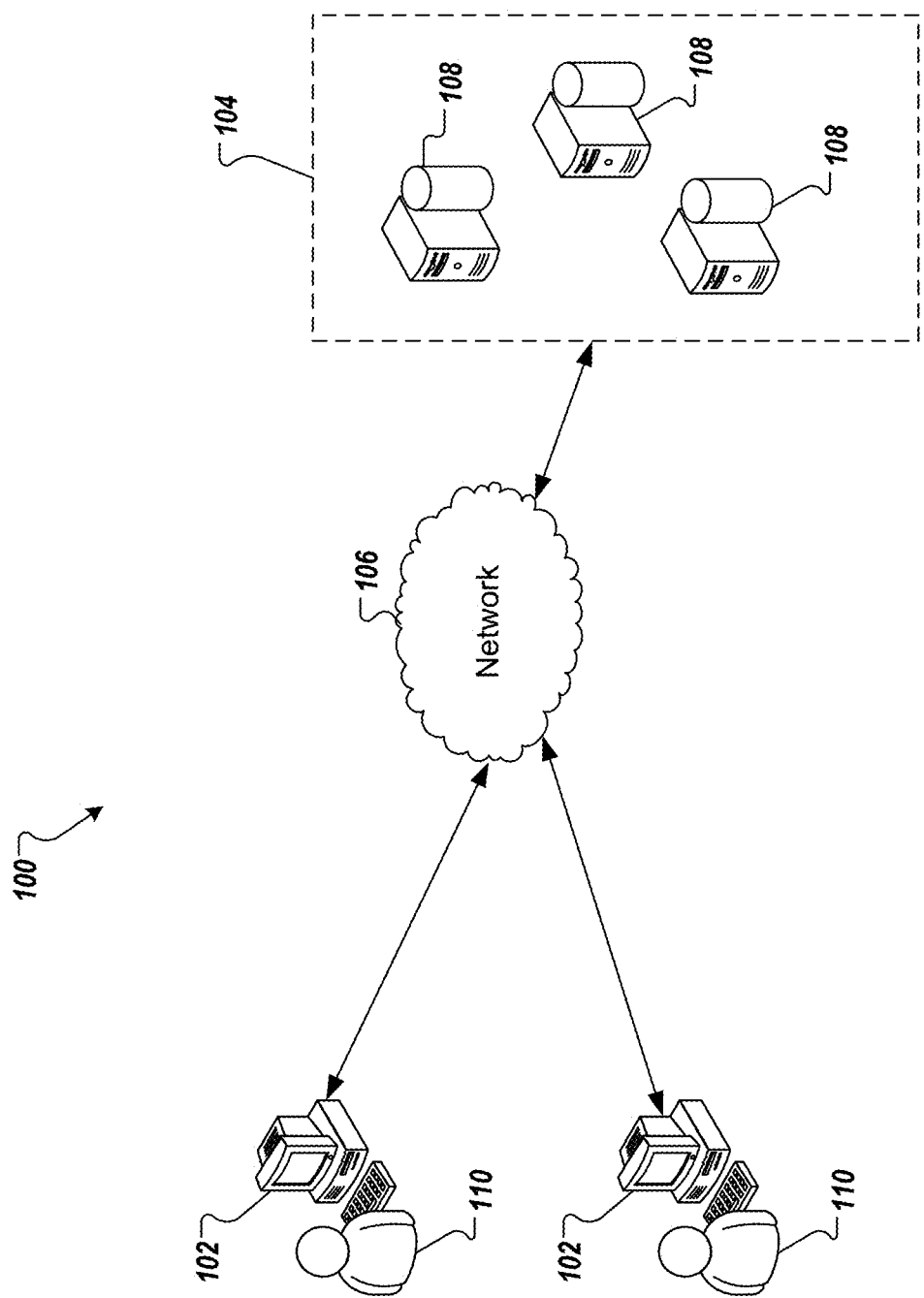
FIG. 1 depicts an example architecture that can be used to execute implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 108 can include a user, who interacts with an application that is hosted by the server system 104. In another example context, a user 108 can include a user, who interacts with the server system 104 to perform one or more maintenance procedures, described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices, e.g., the client devices 102, over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

Implementations of the present disclosure are described in further detail herein with reference to an example context. The example context includes business applications that are executed on a client-server architecture, such as the example architecture 100 of FIG. 1. In some examples, business applications can be provided in a business suite that includes two or more business applications. Example business applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context, e.g., healthcare applications.

Referring again to FIG. 1, and in the example context, one or more business applications can be hosted by the server system 104. A user 110 can interact with a business application using the client device 102. More specifically, a session can be established between the client device 102 and one or more server devices 104, during which session the user 110 is able to interact with one or more business applications hosted on the server system 104. The one or more business applications can enable the user to interact with data stored in one or more databases. In some examples, interactions can result in data being stored to the database, deleted from the database, and/or edited within the database.

In some implementations, applications and/or databases undergo lifecycle management. In some examples, lifecycle management includes executing one or more maintenance procedures for an application and/or a database. Example maintenance procedures can include an upgrade procedure, a patch procedure, a customer configuration procedure, and development and testing procedures. An example upgrade procedure can include updating software. For example, an application can be updated from a first version, e.g., V1, to a second version, e.g., V2. An example update can include adding functionality to the application. As another example, a database can be updated from a first version, e.g., V1, to a second version, e.g., V2. An example update can be updating a data schema of the database. In some examples, a data schema (also referred to as database schema) is a data structure that defines how data is to be stored in the database. In some examples, the database schema can be defined in a formal language that is supported by a database management system (DBMS), and can include a set of formulas (also referred to as constraints) imposed on the database. In general, a data schema can be described as a catalog that specifies all database objects that can be stored in the database. In some examples, different data schemas, e.g., V1 versus V2, can have different objects with the same object name, but different structures.

As introduced above, the execution of maintenance procedures traditionally results in downtime (e.g., unavailability) of an application, and/or database. Implementations of the present disclosure enable zero downtime of the application, and/or database during maintenance procedures. That is, implementations of the present disclosure provide continuous availability of an application and/or data during one or more maintenance procedures. Implementations of the present disclosure are particularly directed to scenarios, in which an application is undergoing maintenance (e.g., upgrade to a new version (ideally without downtime), and, simultaneously, the database accessed by the application is partially replicated to another database (e.g., not a full database replication). For example, S/4HANA application, provided by SAP SE of Walldorf, Germany, can undergo an upgrade, and parts of the database are replicated to another database using the SAP Landscape Transformation Replication Server, also provided by SAP SE. In some examples, the S/4HANA application is upgraded with zero downtime through a software update manager. In systems using replication, typically, a full replication is performed once, then only deltas are replicated to the other database. This way, the replicated set of data is always available, and up-to-date.

Executing maintenance procedures in scenarios where a portion of data is replicated between databases can present several problems. For example, replication can hinder the maintenance procedure, and the maintenance procedure can inhibit replication. That is, the replication instruments the database with triggers, and logging tables. The triggers read data written to the database, analyzes the data, and stores data in logging tables. The logging tables are read by the replication software, reading the data from the database, and writing the data to another database. If the maintenance procedure (upgrade) is to modify a table, the trigger is detected, it can be determined that a change to the table is incompatible. Consequently, the modification is not performed, so the trigger remains functioning. Further, the upgrade changes the structures of tables to adjust to the new version. This can imply changes, which can damage the trigger logic (e.g., the key of the table is altered and the trigger storing key values of the modified records in the logging table).

As another example, the upgrade can trigger full reload of replicated data. For example, if the database is relatively larger (e.g., in terms of amount of data stored), the replicated data can also be relatively large. This implies that replicating the database to another database can take a significant amount of time, and resources (e.g., processing power, bandwidth). When the upgrade modifies a table, or the content of a table, potentially the complete table has to be replicated again, which can lead to downtime on the target side of the replication, as the data set can be inconsistent during replication of the complete set. For example, the upgrade adds one column and updates the column of the table. This would fire the replication trigger for every record, thus typically, the complete set of rows is replicated again.

As another example, downtime can result from inconsistent data sets. For example, the upgrade can modify the database of the application on the source side (replicated from). If this deployment occurs with downtime, the downtime on the target side (replicated to) will experience downtime as well, as the inconsistent temporary stages during the upgrade are replicated as well. Thus, also the target side can be inconsistent.

To address issues in maintenance procedures in systems including replication between databases, such as the above issues, implementations of the present disclosure introduce a view-layer between the application, and the persistency. In some implementations, the upgrade procedure is performed with a second view-layer, which is built in parallel to a first view-layer to provide the target version structure. In this manner, modifications resulting from upgrade of the database tables, are shielded from the application running on the start version (e.g., application V1). Once the upgrade is completed, the application is switched to use the view-layer of the target (e.g., application V2).

In accordance with implementations of the present disclosure, the replication is designed to run on the view-layer, and not on the table layer of the database. In this manner, the replication is not impacted by modifications to the database layer as a result of the upgrade. In some implementations, the target view-layer is also instrumented to run replication of data. The same view-layer, and switch to the target version view-layer is introduced on the consumer-side.

To provide further context for implementations of the present disclosure, a so-called blue-green deployment for maintenance procedures is described. In some examples, the blue-green deployment can provide zero downtime deployments of new software versions. The name blue-green deployment is derived from analogy to mechanisms used for runtime blue-green deployments. In runtime blue-green deployments, a new (green) runtime is deployed in parallel to a current (blue) runtime. After deployment, users are re-directed to the green runtime, and the blue runtime is stopped.

The blue-green deployment can be used for scenarios including so-called code push down, in which database objects, such as views, table functions, and procedures, that are pushed to the database. In some examples, a separate database schema is used as the runtime environment for the code in the database. This schema is referred to as an access schema, and includes the code objects. A separate, so-called data schema holds the persistency. The application only has access to the access schema, and objects in the data schema are exposed as views to the access schema. During the blue-green deployment, a new access schema (green) is provided for the target version (e.g., V2) in parallel with the current access schema (blue) used by the source version (e.g., V1, also referred to as source, and/or production). Accordingly, during the deployment (upgrade), there are multiple access schemas existing at the same time (e.g., blue, and green).

The blue-green deployment enables structure, and name abstraction. For example, the view layer hides structure changes, and content changes in the data schema during the deployment. For example, new columns can be added during the deployment. The new columns are not selected by the view in the blue access schema. A table column can have a different name than specified (e.g., in a data dictionary (DDIC)). In this manner, complex type changes can be performed without affecting availability of the table data. For example, a new column can be added with the target type, and populated with data. In the green access schema, the target column is exposed instead of the previous column.

As another example, a table can have a different name than specified (e.g., in the DDIC). This enables a shadow table to be created and populated for a production-use table. In the green access schema, the new table is then exposed instead of the old table. In some examples, obsolete columns, and tables are deleted from the persistency after the deployment is complete. As another example, a rename column, and a rename table traditionally require an exclusive database lock, and which would result in downtime. To avoid this, the names of the tables in the data schema are not adjusted to the DDIC names after the deployment, and remain to be used during the release. The name differences are shielded from the application by the view layer in the access schema.

The blue-green deployment also enables various data migration approaches. For example, in a shadow column migration, if the data in one column only needs to be migrated (e.g., column B), a so-called shadow column (e.g., B #1) can be added to the table, and include a new data type. The shadow column is populated with data migration tools, and is kept up-to-date using database triggers. This approach limits the data volume to be copied. In some examples, the view layer in the blue access schema hides the shadow field from the running application. In some examples, the view layer in the green access schema selects the shadow column, and exposes the shadow column with the correct name (e.g., select B #1 as B). After the switch-over, the original column (B) can be dropped.

As another example, in shadow table migration, the complete table is to be copied, in case the key changes, or data migration runs on most columns. In this case, a copy of the table (e.g., TAB) is created, with a new name (e.g., TAB #1), and the new structure. The database migration is read from the blue table (TAB), and written to the green table (TAB #1). The view layer in the blue access schema hides the shadow table (TAB #1) from the running application. The view-layer in the green access schema selects the shadow table, and exposes the access table with the correct name (e.g., create view TAB as select* from TAB #1). After the switch-over, the blue table (TAB) can be dropped.

In view of the above context, implementations of the present disclosure leverage the blue-green approach, in an application upgrade, where data is also replicated between databases. In accordance with implementations of the present disclosure, replication is considered during a change event, and operates without interruption during the blue-green deployment. More particularly, and as described in further detail herein, implementations of the present disclosure enable mechanisms in the blue-green procedure to plug-in replication tasks, so replication can react to changes, and prepare replication of new content. In some implementations, the blue-green approach is implemented on both the data consumer-side (e.g., database data is replicated to) of replication, and the data source-side (e.g., database data is replicated from). This coordinated approach provides, among other advantages, reduction in resource consumption and duration for new full-upload of data for changed tables.

Implementations of the present disclosure include a deploy tool (e.g., a zero downtime maintenance (ZDM) deploy tool), and a replication system (RS). An example ZDM procedure, and respective deploy tool (referred to as an upgrade tool) are described in further detail in commonly assigned, U.S. application Ser. No. 14/495,056, filed on Sep. 24, 2014, the disclosure of which is expressly incorporated herein by reference in its entirety for all purposes.

In accordance with implementations of the present disclosure, the deploy tool runs the blue-green upgrade procedure, computes, which tables are migrated using a clone table (also referred to as shadow table), and/or a clone column (also referred to as a shadow column), and computes and executes statements to transform the source-side system (e.g., providing a green access schema), as described herein. The deploy tool provides respective statements to the RS for execution on a consumer-side system. In this manner, the consumer-side system can come into symmetry with the source-side system. In some examples, the deploy tool waits for RS to complete one or more actions, before the deploy tool conducts further actions on the consumer-side, and sends respective statements to the RS.

In accordance with implementations of the present disclosure, the RS instruments the source-side, and the consumer-side, and replicates data from the source-side to the consumer-side, even during upgrade of an application acting on the source-side. The RS performs an initial data transfer, and an incremental transfer of changed data. The RS receives statements from the deploy tool for actions to be executed on the consumer-side. The RS is triggered by the deploy tool to execute actions, and notifies deploy tool once the actions are completed.

Figure 2A:
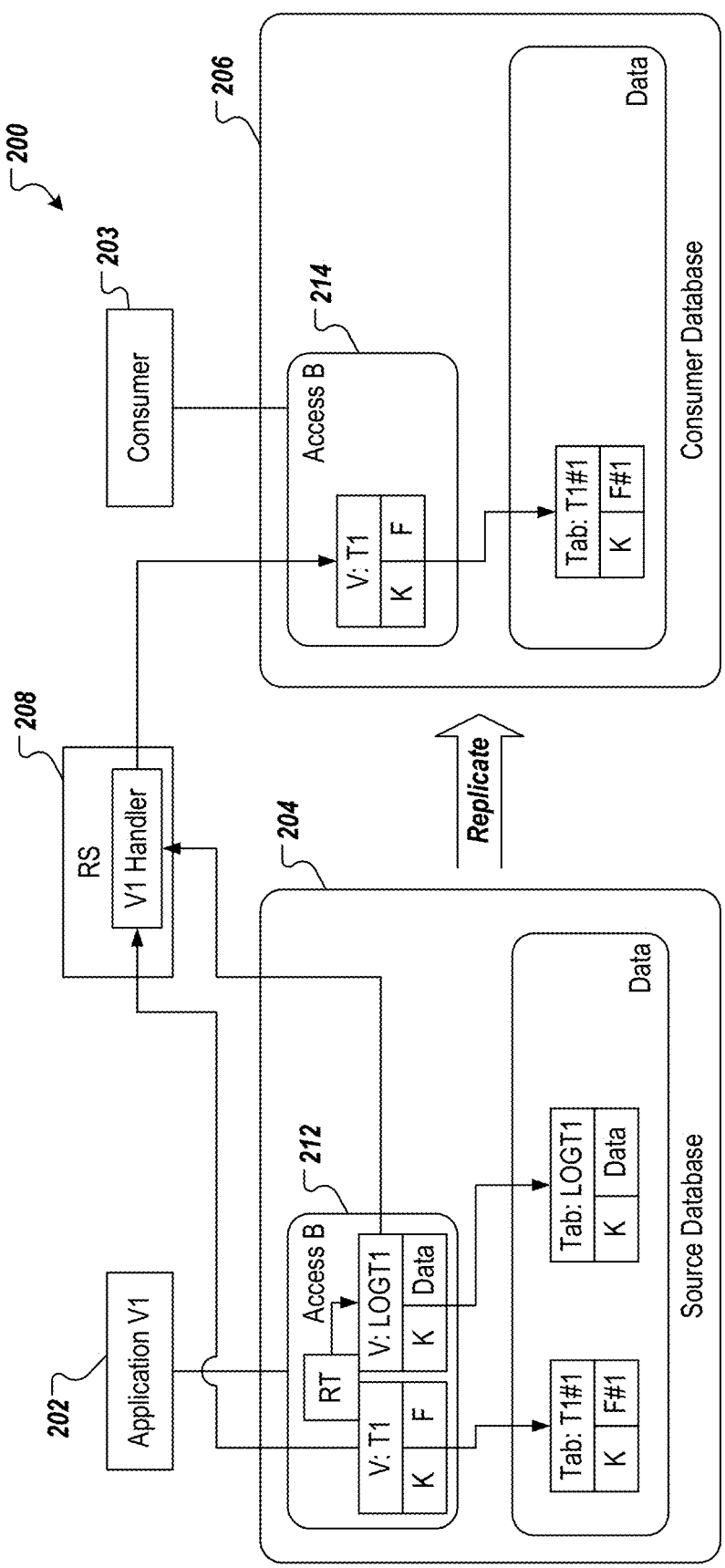
FIGS. 2A-2C schematically depict zero downtime upgrade in accordance with implementations of the present disclosure.
Figure 2B:
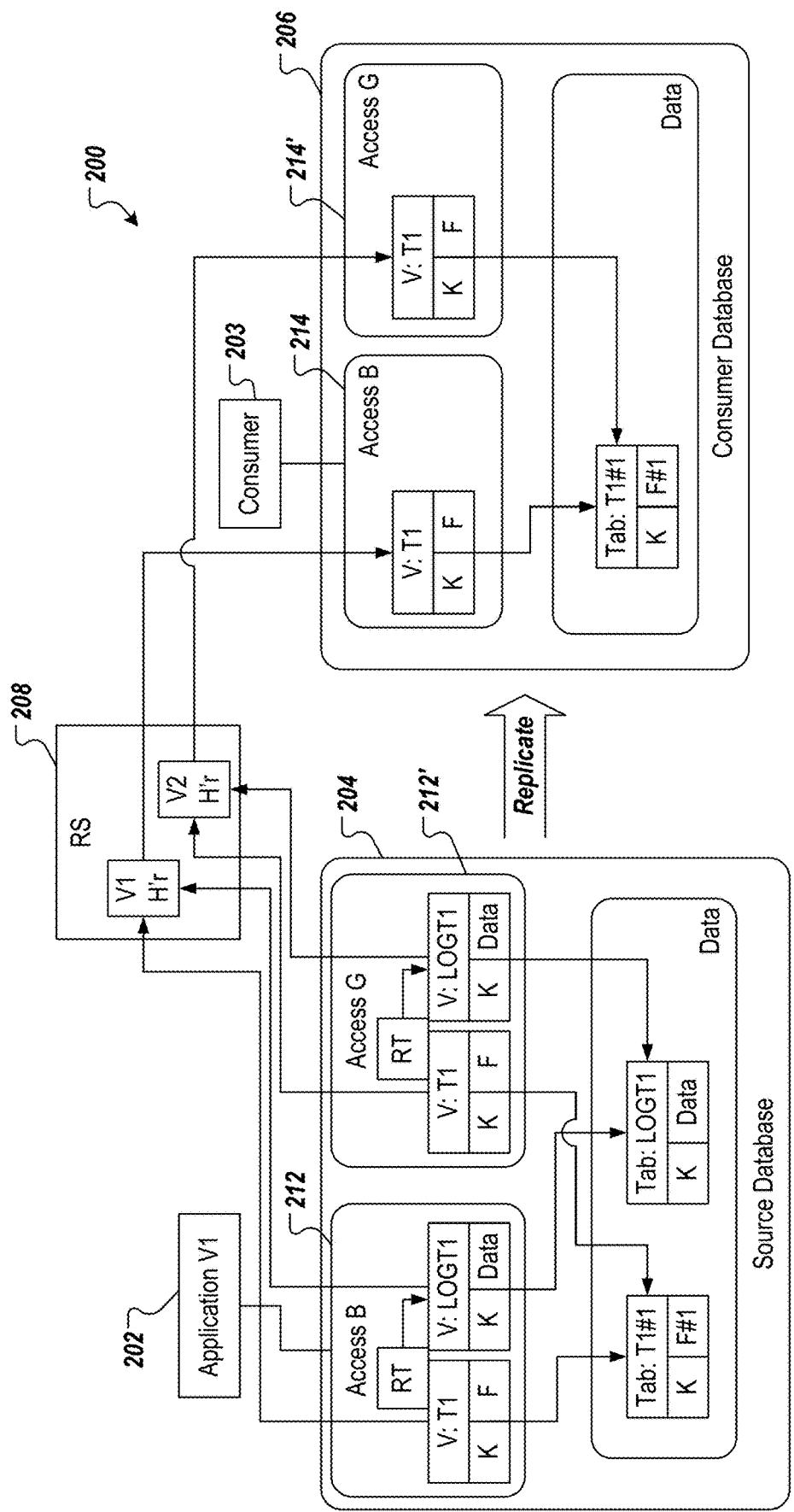
Figure 2C:
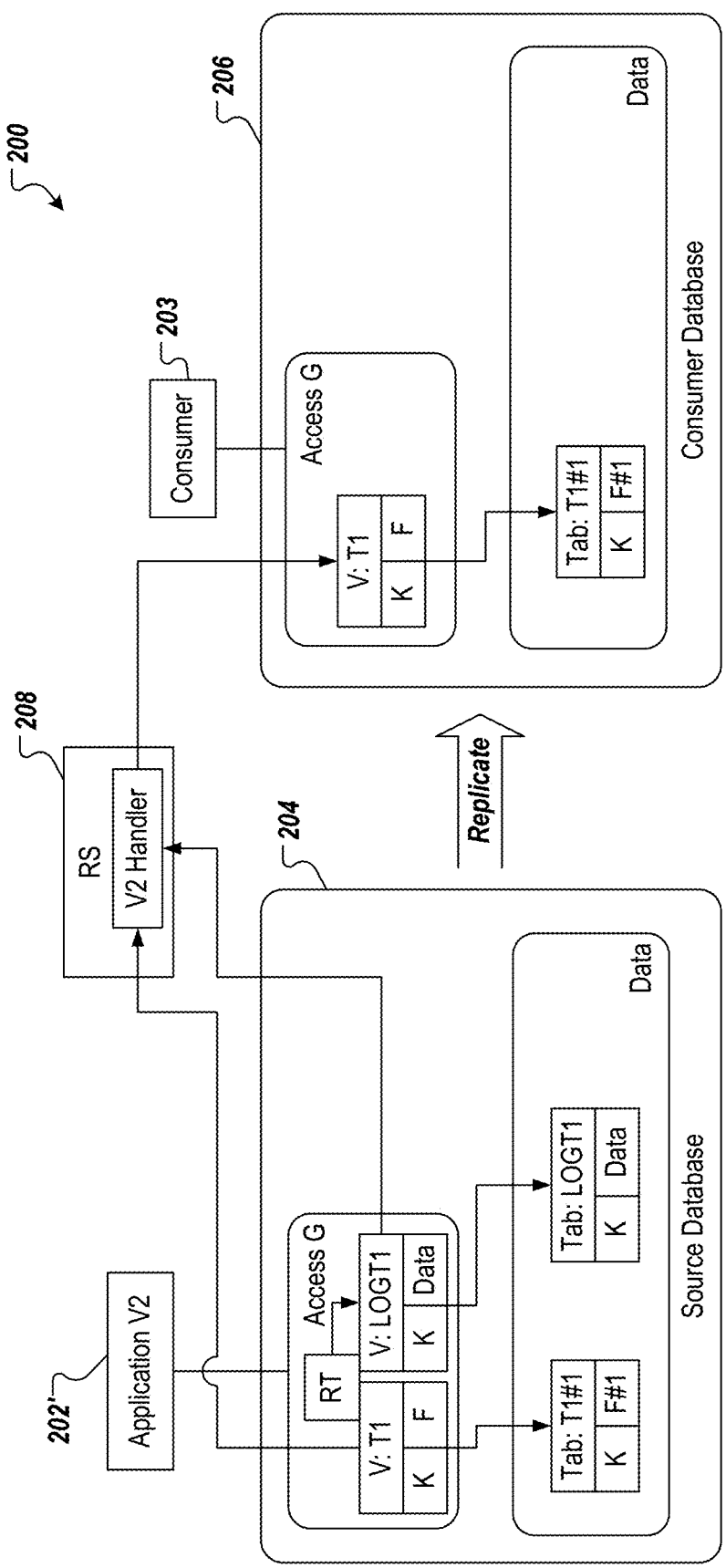

FIGS. 2A-2C schematically depict zero downtime upgrade in accordance with implementations of the present disclosure. With particular reference to FIG. 2A, a system 200 includes an application 202 (e.g., an application that is to undergo an upgrade from V1 to V2), a consumer 203 (e.g., that consumes data), a first database system 204, and a second database system 206. At least a portion of data stored in the first database system 204 (e.g., source-side) is replicated to the second database system 206 (e.g., consumer-side). In the depicted example, a replication system (RS) 208 is provided, which includes a handler (V1 handler) for replicating data from the first database system 204 to the second database system 206. For example, the RS 208 reads data from the first database system 204, and writes the data to the second database system 206. To setup for deployment, and as described in further detail herein, the RS 208 creates one or more triggers on the projection view(s) in access schema(s). The RS creates one or more log-tables (e.g., using DDIC).

In accordance with implementations of the present disclosure, a blue access schema (Access B) 212 is provided in the first database system 204. The Access B 212 enables the application 202 to interact with data stored in the first database system 206. In the depicted example, the Access B 212 includes a view (V: T1), and a view (V: LOGT1) on respective tables (T1 #1, TLOG1). Also, a replication trigger (RT) is provided between the views. For example, and as introduced above, the RS 208 creates the log table (TLOG1) in the data schema, the view (V: LOGT1) on the log table in the Access B 212, and the RT. A corresponding blue access schema (Access B) 214 is also provided in the second database system 204, which enables the RS 208 to replicate data into the second database system 206. In the depicted example, the Access 214 includes a view (V: T1) on a respective table (T1 #1). Accordingly, a symmetric setup is provided on the consumer-side of replication relative to the source-side.

As described herein, the RS 208 reads the log table through the Access B 212, and writes to the consumer-side through the Access B 214. Accordingly, changes done to the table in data schema (write), are not recorded by the trigger in the access schema. If a data manipulation is executed on the database table, this is not recorded by the RS 208. This provides the advantages that the RT does not need to be programmed with the name-mapping of tables and columns, the procedures are de-coupled, and the RS 208 does not need to know about intermediary structures.

With particular reference to FIG. 2B, for execution of the upgrade, an upgrade handler (V2 handler) is provided in the RS 208, and respective green access schemas (Access G) 212', 214' are provided in the first database system 204, and the second database system 206. In this manner, the source-side, and the consumer-side are symmetrical. As depicted in FIG. 2C, when the upgrade switches the application usage from the application 202, using the Access B 212 to an upgraded application 202' (V2), using the Access G 212', the consumer-side is also switched to use the Access G 214', and the Access B 212, 214 can be removed.

In further detail, during a blue-green deployment, changes made to the persistency in the replication source (source-side) are replicated to the target (consumer-side). Alternatively, and to reduce the volume of data to be sent for replication, the action executed on the source-side is mirrored on the consumer-side. For some operations, which are generic and can be executed within the database this is feasible (e.g., cloning tables, columns, altering table structures). For other operations, however, the upgrade tools would also have to run on the consumer-side (e.g., application defined methods that write content). This is neither feasible nor desirable. Accordingly, the changes are partially managed using in-place action on the consumer-side mirroring action on the source-side, and partially replicating the change done on the source-side.

In some implementations, with the blue-green deployment, multiple mechanisms are used to modify table structure and content. Example mechanisms include clone table, and clone column.

With regard to clone table, a new table is created, and a suffix with a version number is appended to the table name. For example, a table TAB #<n>, is cloned to provide a clone table TAB #<n+1>. The data is copied to from the original table to the cloned table. In case the table is read-write (R/W) for the application during the deployment, changes are replicated from TAB #<n> to TAB #<n+1> using database triggers. The data copy adjusts content to the new structure of TAB<n+1>. The deployment procedure writes data to TAB<n+1>. A projection view in the target access schema is created to expose the table to the consumers (e.g., also views). The projection view maps the database names to the DDIC names.

Implementations of the present disclosure provide a replication approach for clone table. In some implementations, the clone table is created in the target (consumer-side) database, and uses the same structure as defined in the source-side. Data copied from TAB #n to TAB #n+1 is also copied on the consumer-side. In some examples, statements used to clone the table on the source-side can be used to clone the table on the consumer-side. This minimizes the data volume to be sent from source-side to consumer-side. In some examples, changes done to the clone table after creation (e.g., writing data through deployment, writing data through replication) need to be replicated to the clone table on the consumer-side. To achieve this, a replication setup for the clone table is provided, and can include, without limitation, a log table, and a trigger (RT).

With regard to clone column, a new column is added to the table, the name of the clone column is based on the name of the original column. For example, if the column is named F, the clone column is F #1, or, if the original column is F #<n> the clone column is F #<n+1>. Data is copied from the original column to the clone column, adjusting content to the new format. In some examples, the adjustment can be done using a type mapping (e.g., HANA type mapping), using generically provided SQL code (e.g., for making NUMC longer (a number written to a string, 0-padded from the left)), or using an application-provided SQL. In case the table is R/W for the application during the deployment, changes are replicated from #<n> to #<n+1> using database triggers. A projection view in the consumer-side access schema is created to expose the table to the consumers (e.g. also views). The projection view maps the database names to the DDIC names.

Implementations of the present disclosure provide a replication approach for clone columns. A clone column created in the consumer-side database system will have the same structure as defined in the source-side database system. If the data fill is run on the source-side, and all changes replicated to the consumer-side, the full table would be replicated again, as every row is updated, and triggers operate on the row level. To avoid this, implementations of the present disclosure exclude the initial data fill for the clone column from replication, but to updates the clone column in the consumer-side database from the corresponding table in the consumer-side database. In some examples, only changes to the table performed by the application (e.g., under upgrade) are replicated. To achieve this, implementations of the present disclosure, exclude update of a clone column update from replication, execute the same clone column update executed on source-side table also on the consumer-side table, and replicate changes done by the application to the source-side table (and the triggered update on the clone column) to the consumer-side table.

In some implementations, for shadow column migration, the shadow column is filled from the original column, transforming the data upon transfer. For the shadow table the shadow table is filled from the original table, transforming the data upon transfer. The shadow column is filled on the consumer-side side from the original column. A trigger (RT) is used to replicate data from original column to shadow column also on the consumer-side. For the shadow table approach, the initial data transfer to set up the shadow table is executed on the consumer-side as well. Data replication transfers the data changes from the original table and the shadow table on the source-side to the consumer-side.

Figure 3A:
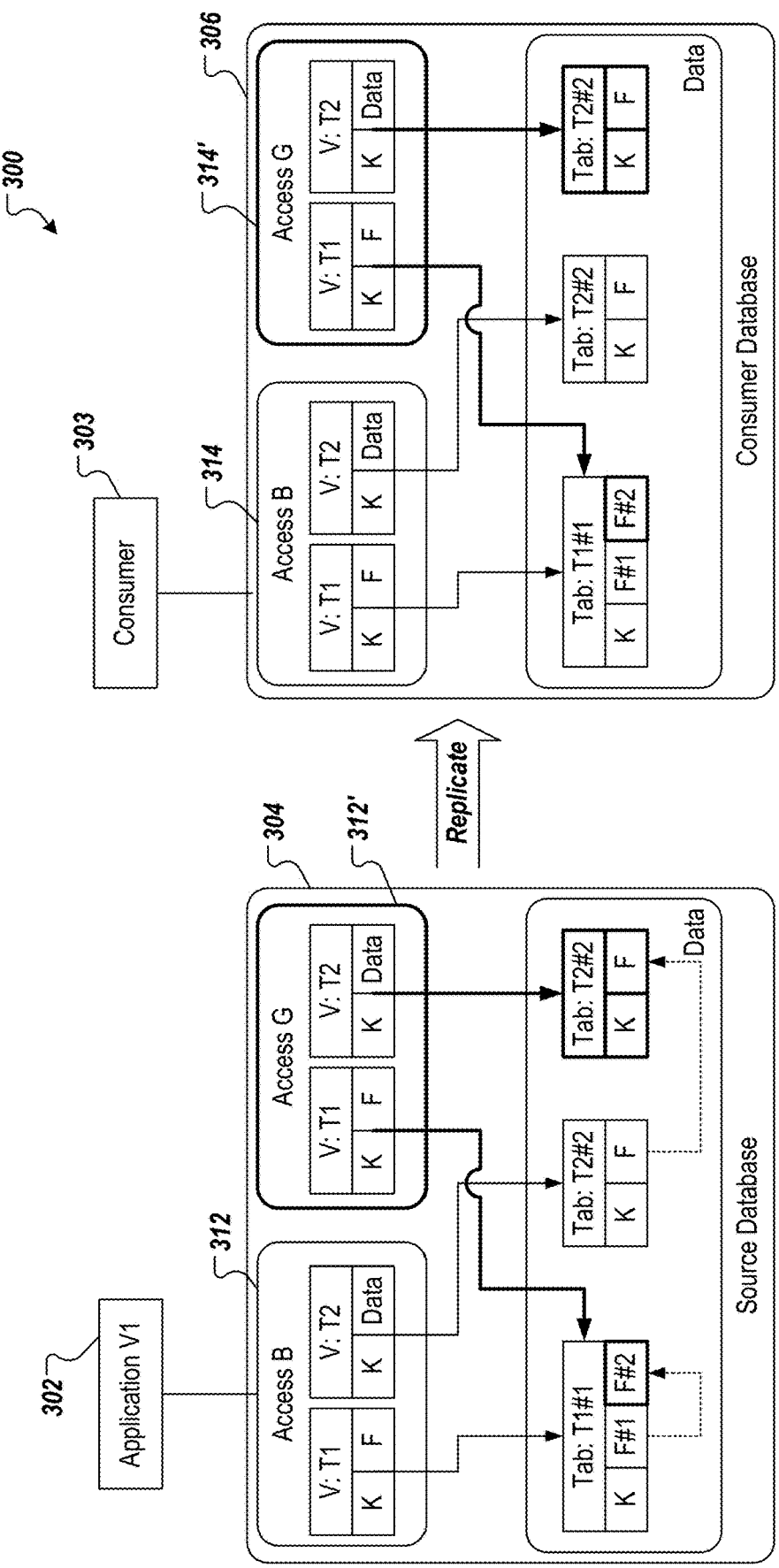
FIGS. 3A and 3B schematically depict example replication in accordance with implementations of the present disclosure.
Figure 3B:
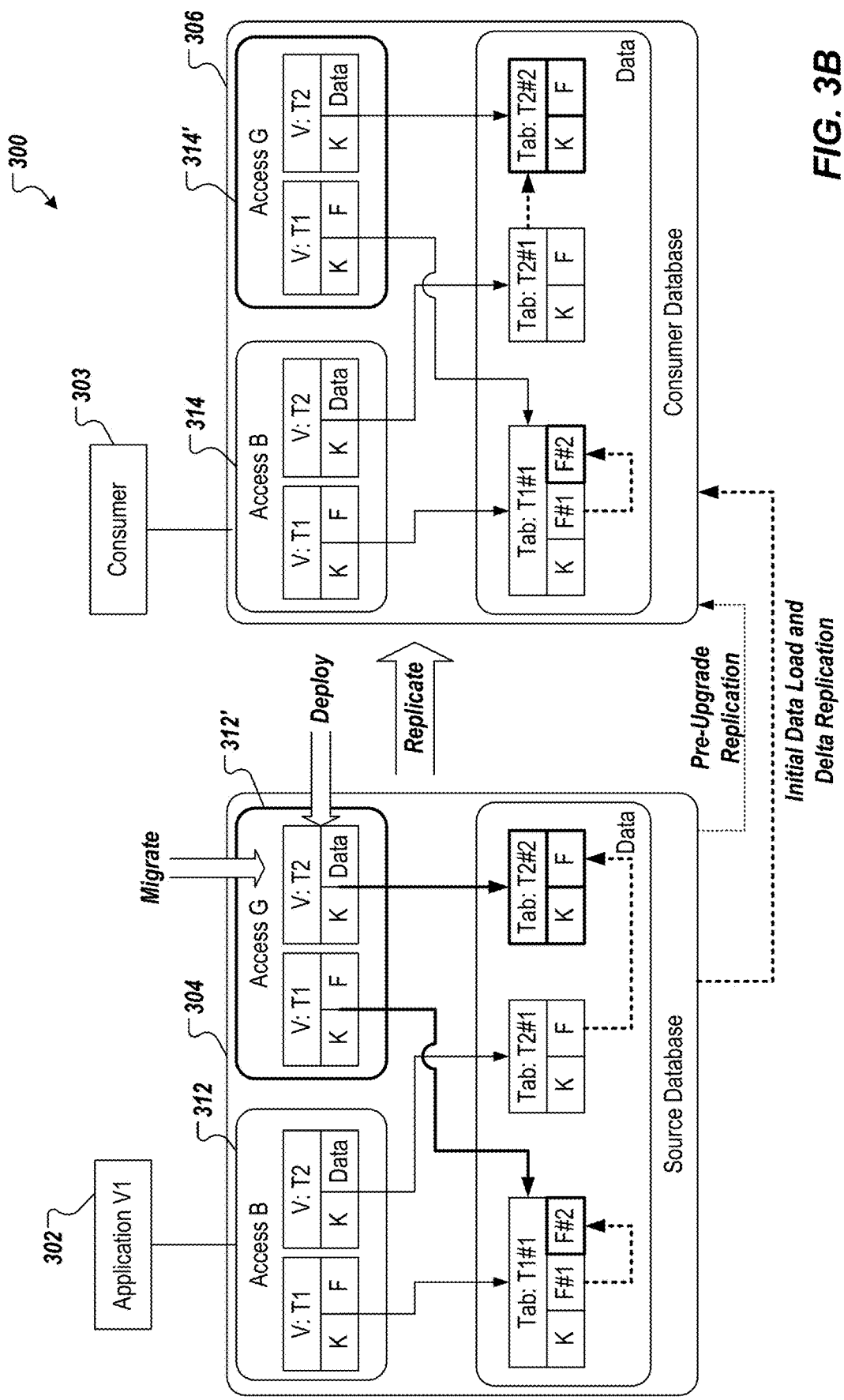

FIGS. 3A and 3B schematically depict example replication during upgrade in accordance with implementations of the present disclosure. As similarly described above, with reference to FIGS. 2A-2C, FIGS. 3A and 3B depict an example system 300 that includes an application 302 (e.g., an application that is to undergo an upgrade from V1 to V2), a consumer 303 (e.g., that consumes data), a first database system 304, and a second database system 306. At least a portion of data stored in the first database system 304 (e.g., source-side) is replicated to the second database system 306 (e.g., consumer-side). Although not depicted in FIG. 3A or 3B, a RS is provided, which includes respective version handlers, a handler (V1 handler), and a handler (V2 handler), for replicating data from the first database system 304 to the second database system 306. For example, the RS reads data from the first database system 304, and writes the data to the second database system 306. To setup for deployment, and as described in further detail herein, the RS 308 creates one or more triggers on the projection view(s) in access schema(s). The RS creates one or more log-tables (e.g., using DDIC).

In further detail, FIGS. 3A and 3B depict a blue-green approach for data replication between database systems during an upgrade procedure. In the depicted example, original (blue) access schemas, Access B 312, and Access B 314, are provided in the first database system 304, and the second database system 306, respectively. Further, new (green) access schemas, Access G 314, and Access G 314', are provided in the first database system 304, and the second database system 306, respectively. In the example of FIGS. 3A and 3B, components and data flows of the green system are bolded.

FIGS. 3A and 3B depict both a clone table approach, and a clone column approach, which are described in further detail herein. For example, in the data schemas of both the source-side, and the consumer-side, a column F #1 is cloned to provide a clone column F #2 (bolded column), and a table T2 #1 is cloned to provide a cloned table T2 #1 (bolded table). During upgrade of the application 302 data is replicated from the source-side to the consumer-side through the green system.

With particular reference to FIG. 3B, prior to initiating the upgrade procedure (i.e., deployment of the upgrade by the deploy tool), data is replicated from the source-side to the consumer-side. For example, as data is written to the column F #1 in the source-side, the data is replicated to the column F #1 in the consumer-side. As another example, as data is written to the table T2 #1 in the source-side, the data is replicated to the table T2 #1 in the consumer-side.

After the upgrade procedure is initiated, the clone column F #2, and the clone table T2 #2 are created on both the source-side, and the consumer-side, as described in further detail herein. Each of the clone column F #2, and the clone table T2 #2 (on both the source-side, and the consumer-side) are empty. Data is copied from the original column/table to the respective clone column/table. In some implementations, an initial data load is performed locally in each of the source-side, and the consumer-side. For example, the data in the original column F #1 is copied to the clone column F #2 (in both the source-side, and the consumer-side). As another example, the data in the original table T2 #1 is copied to the clone table T2 #2 (in both the source-side, and the consumer-side). After the initial data load, the source-side, and the consumer-side are symmetrical, and only data deltas are replicated from the source-side to the consumer-side.

Figure 4A:
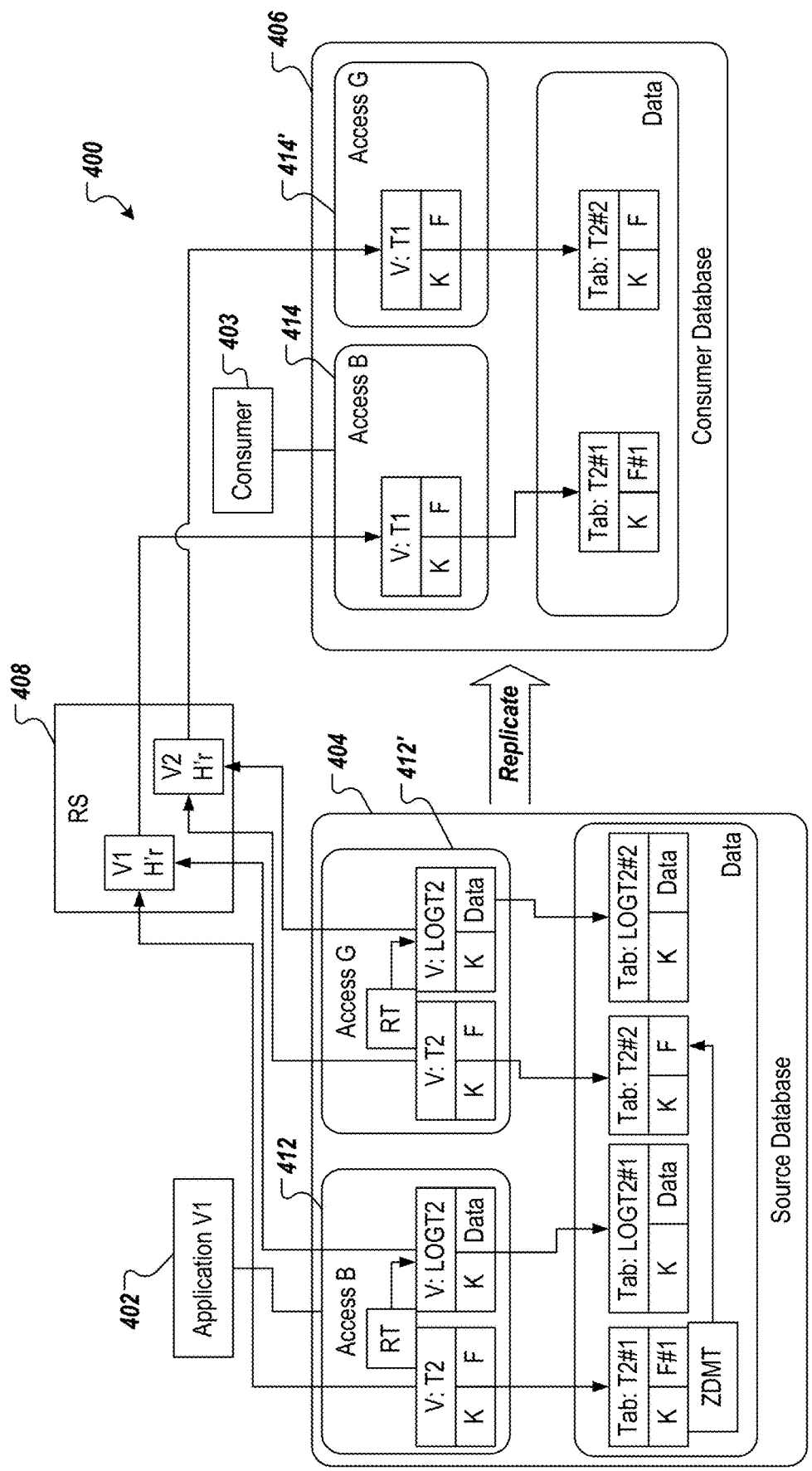
FIG. 4A schematically depicts an example replication for a clone table in accordance with implementations of the present disclosure.

FIG. 4A schematically depicts an example replication for a clone table in accordance with implementations of the present disclosure. As similarly described above, with reference to FIGS. 2A-2C, FIG. 4A depicts an example system 400 that includes an application 402 (e.g., an application that is to undergo an upgrade from V1 to V2), a consumer 403 (e.g., that consumes data), a first database system 404, and a second database system 406. At least a portion of data stored in the first database system 404 (e.g., source-side) is replicated to the second database system 406 (e.g., consumer-side). In the depicted example, a replication system (RS) 408 is provided, which includes respective version handlers, a handler (V1 handler), and a handler (V2 handler), for replicating data from the first database system 404 to the second database system 406. For example, the RS 408 reads data from the first database system 404, and writes the data to the second database system 406. To setup for deployment, and as described in further detail herein, the RS 408 creates one or more triggers on the projection view(s) in access schema(s). The RS creates one or more log-tables (e.g., using DDIC).

More particularly, the blue-green procedure includes phases of preparation, green system build, switch-over, and blue system deconstruction. As depicted in FIG. 4A, a table T2 #2 is created in the data schema of the first database system 204, and the statement for creating the table T2 #2 is provided to the RS 408. The table T2 #2 is a clone of a table T2 #1 in the data schema of the first database system 404. A zero-downtime maintenance trigger (ZDMT) is created on the table T2 #1, and the statement for creating the ZDMT is provided to the RS 408. An initial data transfer is performed, and the statement for running the initial data transfer is provided to the RS 408. This, however, does not initiate a full replication of T2 #2. Instead, T2 #2 is built from T2 #1. In some examples, replication by the RS 408 switched on for T2 #2 before load of ZDM to T2 #2. In some examples, ZDM replication is continuously run T2 #2 (replication to be completed). In some implementations, to build the green scheme, a projection view (PV), the Access G 412', is created on T2 #2, and the statement for creating the Access G 412' is provided to the RS 408.

The RS 408 creates a log table on T2 #2 (LOGT2 #2), a projection view to LOGT2 #2, and a replication trigger (RT) in the Access G 414'. The RS 408 is able to replicate data to the consumer side. The upgrade of the application 402 is deployed, during which data is written to T2 #2 through the respective projection view of the Access B 412, and the ZDMT (e.g., data written to T2 #1 through the projection view T2 of the Access B 412 is written to T2 #2 through the ZDMT).

After the upgrade is complete, the application (upgraded to V2) on the source-side is switched over to the green system (the Access G 412'). The RS 408 reads any remaining blue log entries, and replicates to the blue system on the consumer-side. The RS 408 is triggered to switch on consumer-side from blue to green (i.e., from the Access B 412' to the Access G 414'). The blue system is deconstructed. For example, the log table (e.g., through the DDIC), the RS trigger (list of statements), the projection view on T2 #1 in the Access B 412, and the ZDMT on T2 #1, and the Access B 214 are dropped, and respective statements are passed to the RS 408.

In general, and as described herein, clone table replication includes set-up of the RS, a procedure executed by the RS, and replication by the RS. In some implementations, set-up of the RS includes providing a replication trigger (RT) on the projection view, adding a log table, and projection view on the log table, and executing a sequence (statements) in the data schema. In some implementations, the procedure executed by the RS includes receiving statements, creating a clone table (e.g., T2 #2), copy data from the original table (e.g., T2 #1) to the clone table (e.g., T2 #2) on the consumer-side, build a green system (e.g., create Access G including a projection view for T1 onto T2 #2), switch-over (e.g., switch the consumer-side from the Access B to the Access G), and deconstruct the blue system (e.g., execute statements from the source-side), drop the projection view the Access B, drop the ZDMT, and drop the original table T2 #1. In one example, replication includes the RS replicating from T2 #1 to the consumer-side, while the upgrade runs. This is done until the switch-over is complete, and no more data is written to T2 #1. The RS builds T2 #2 with an initial data set in the consumer-side. In another example, replication includes the RS replicating from T2 #2 to the consumer-side, after an initial data load on the consumer-side.

In some implementations, data replicated using the ZDMT from T2 #1 to T2 #2 is not recorded by RS triggers. That is, and as described herein, the trigger (RT) is on the projection view, while the ZDMT writes to the database table. Consequently, data replicated using the ZDMT is explicitly replicated by the RS. To achieve this, in some examples, the RS reads the log table on T2 #1 (e.g., LOGT2

1), and the log table on T2 #2 (e.g., LOGT2 #2) to read the keys, but reads data from T2 #2 for the consumer-side content. If the key is in both logging tables, the content is still read from T2 #2.

Figure 4B:
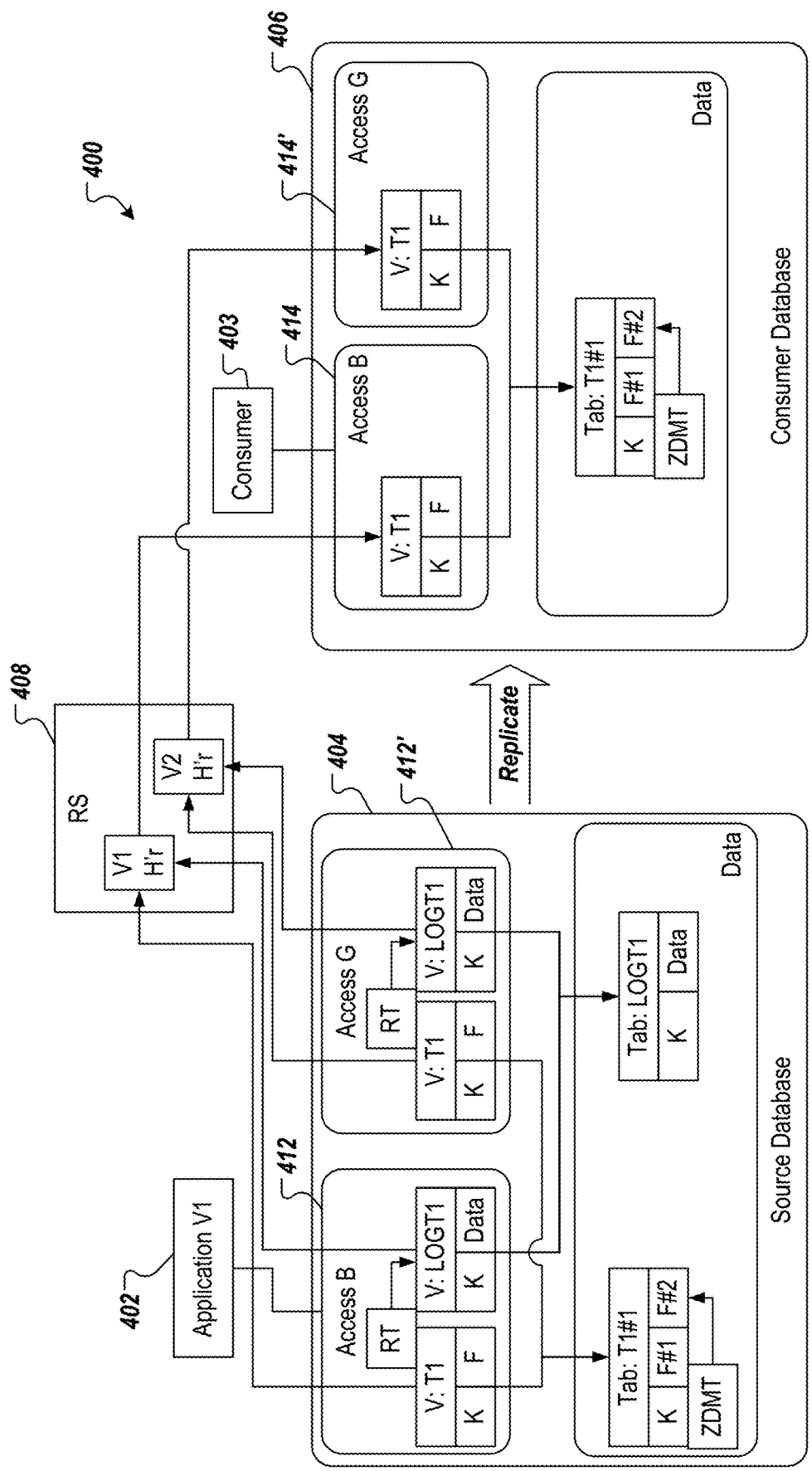
FIG. 4B schematically depicts an example replication for a clone column in accordance with implementations of the present disclosure.

FIG. 4B schematically depicts an example clone column replication in accordance with implementations of the present disclosure. More particularly, FIG. 4B depicts the example system 400 of FIG. 4A configured for replication, in which a column of a table is cloned. In the example of FIG. 4B, a column with the field F #1 is cloned to a clone column with the field F #2. In some examples, one or more constraints are present. Example constraints can include, without limitation, only non-key (K) columns can be cloned. For optimizations, the RS 408 only stores keys in the log table (LOGT1), not complete data records.

In some implementations, the blue-green procedure includes phases of preparation, green system build, switch-over, and blue system deconstruction. As depicted in FIG. 4B, a clone column (F #2) is added to the table (T1 #1), and a respective statement is provided to the RS 408. A ZDMT is created on the table to replicate from F #1 to F #2, and a respective statement is passed to the RS 408. The clone column, however, is not visible to the RT of the Access B 412. The data is copied from the column F #1 to the clone column F #2, and respective statements are passed to the RS 408. The RS 408 executes the statements on the consumer-side to provide a symmetrical arrangement (e.g., clone F #1 to provide F #2, provide ZDMT, copy data from F #1 to F #2).

The green system is built. More particularly, a projection view (V: T1) is created in the Access G 412' to select from the clone column F #2 instead of the original column F #1. This projection view statement (e.g., DDL statement) is passed to the RS 402. A projection view (V: LOGT1) is created in the Access G 412' for the log table (LOGT1). The RS 408 creates a RT on the projection view in the Access G 412'. Although the RS 408 has access to the Access G 412' to read from the target release, no data is recorded or replicated until the switch-over. During the switch-over, the application on the source-side (now upgraded to application V2) is switched over to the green system. The RS 408 triggered to read from the green log table through the Access G 412', instead of the blue. The RS 408 also triggers the consumer-side to switch over to the green system.

During deconstruction of the blue system, the RT, the projection view (V: T1) for the original table (T1 #1), and the projection view (V: LOGT1) for the log table (LOGT1) are deleted from the Access B 412, and respective statement are provided to the RS 408. The ZDMT, and the original column (F #1) are dropped, and respective statements are provided to the RS 408.

In general, and as described herein, clone column replication includes set-up of the RS, a procedure executed by the RS, and replication by the RS. In some implementations, set-up of the RS includes providing a replication trigger (RT) on the projection view, adding a log table, and projection view on the log table, and executing a sequence (statements) in the data schema. In some implementations, the procedure executed by the RS includes receiving an add column statement (e.g., DDL statement to add the clone column F #2), executing the add column statement on the consumer-side (e.g., to provide a respective clone column on the consumer-side), receiving a create ZDMT statement, executing the create ZDMT statement on the consumer-side (e.g., to provide a respective ZDMT on the consumer-side), and execute data replication from F #1 to F #2 on the consumer-side. The green system is built including a projection view of the replicated table, and the consumer 403 is switched over to the green system. The blue system is deconstructed, as described herein.

Figure 5:
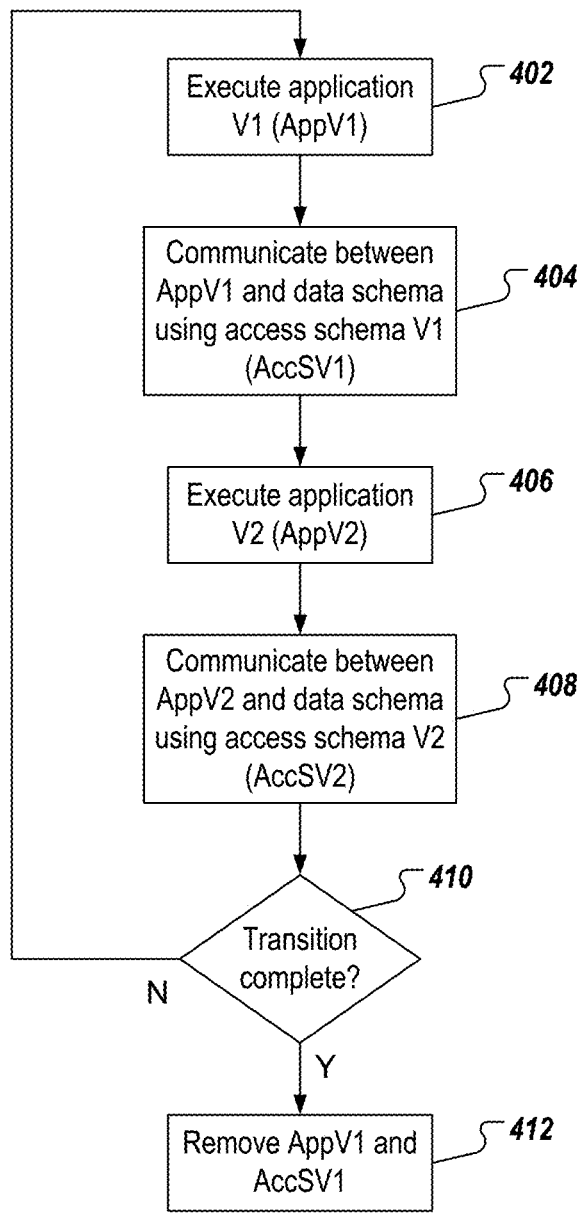
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices (e.g., the server system 108 of FIG. 1). The example process 500 is executed for replication of data from a first database system (e.g., the first database system 204 of FIGS. 2A-2C) to a second database system (e.g., the second database system 206) during upgrade (e.g., zero-downtime upgrade) of an application (e.g., the application 202). In some examples, and as described herein, one or more consumers (e.g., the consumer 203) consume data from the second database system during the upgrade. In some examples, and as described herein, prior to and during the upgrade, the application interacts with the first database system through a blue (original) access schema. In some examples, replication of data from the first database system to the second database system occurs through a replication trigger (RT) of the blue access schema, and a corresponding blue access schema in the second database system.

One or more clone data components are provided in the first database system (502). For example, a deploy tool (e.g., a ZDM deploy tool) triggers creation of the one or more clone data components in the first database system. As described herein, example clone data components can include a clone column (e.g., a copied column of a table, within the table), and a clone table (e.g., a copied table). A green access schema is provided in the first database system (504). For example, the deploy tool triggers creation of the green access schema, which includes one or more views, and one or more replication triggers (RTs) to replicate data from the one or more clone data components in the first database system.

Statements are provided to a replications system (506). For example, the deploy tool provides statements (e.g., DDL statements) to the replication system (e.g., the replication system 208 of FIGS. 2A-2C). In some examples, the statements correspond to respective actions executed in the first database system to create the one or more clone data components, and the green schema. One or more clone data components are provided in the second database system (508). For example, the replication system triggers creation of one or more clone data components in the second database system based on at least a portion of the statements. The one or more clone data components in the second database system correspond to the one or more clone data components created in the first database system. A green access schema is provided in the second database system (510). For example, the replication system triggers creation of the green access schema based on at least a portion of the statements.

Data is replicated from the first database system to the second database system during an upgrade procedure (512). For example, the deploy tool initiates deployment of an upgrade to upgrade the application (e.g., from V1 to V2). During the upgrade, the application interacts with data in the first database system through the blue schema including data stored to, and/or modified within the one or more clone components. Also during the upgrade, the green access schema enables replication of the data to the second database system through the replication system. For example, and as described herein, a first handler of the replication system (e.g., that handles replication prompted by the current version of the application) enables replication of data to the second database system through the blue access schema of the second database system, A switch-over is performed to the green access schema, and the blue access schema is removed (514). For example, upon completion of the upgrade, the upgraded application (e.g., the application 202') interacts with the first database system through the green access schema. As described herein, the blue access schema is removed from the first database system. Statements are provided to a replications system (516). For example, the deploy tool provides statements (e.g., DDL statements) to the replication system. In some examples, the statements correspond to respective actions executed in the first database system to switch-over to the green access schema, and remove the blue access schema. A switch-over is performed to the green access schema, and the blue access schema is removed in the second database system (518). For example, the replication system triggers switch-over to the green access schema, and removal of the blue access schema based on the statements.

Figure 6:
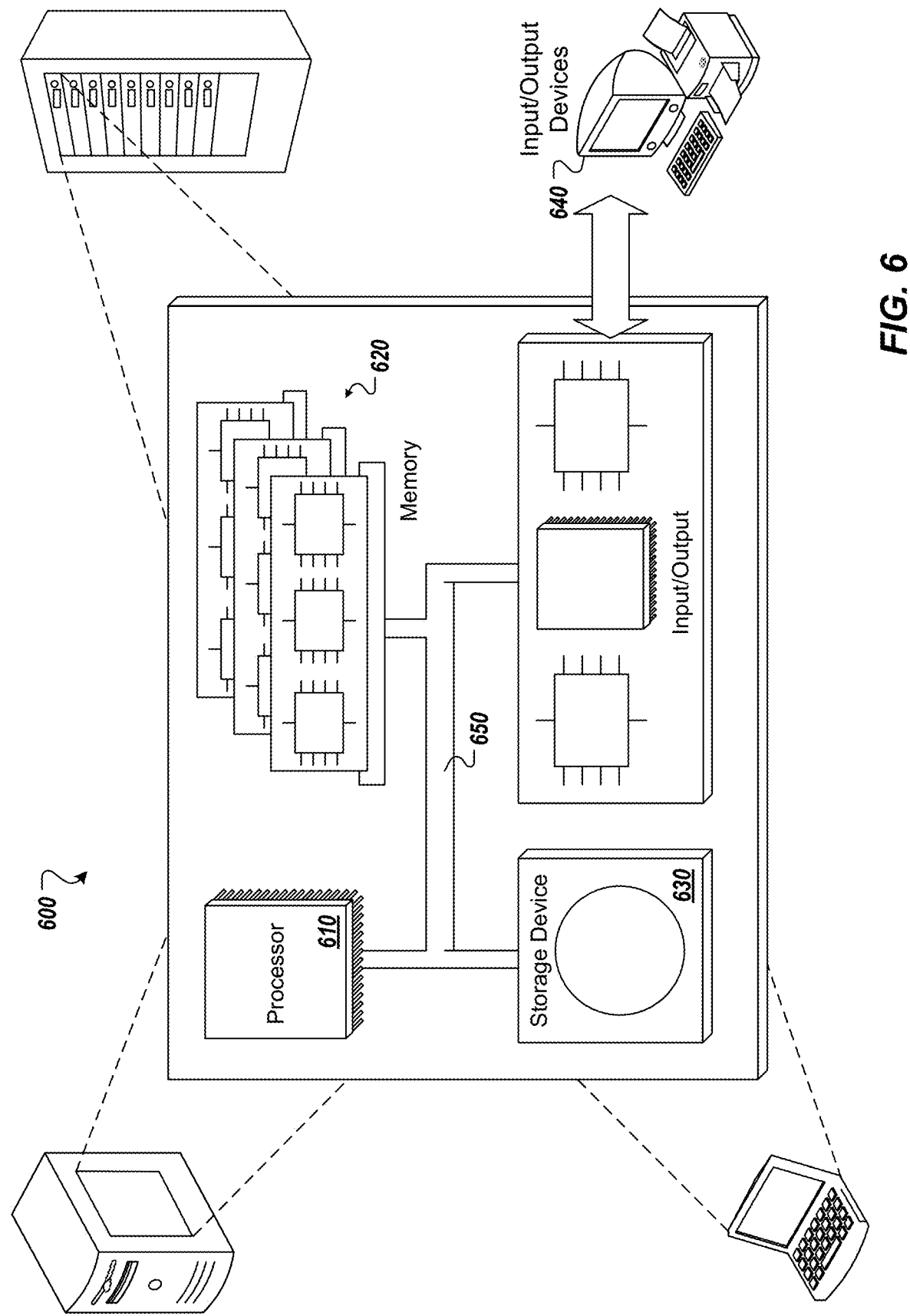
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for replication of data from a first database system to a second database system during upgrade of an application from a first version to a second version, the application interacting with the data in the first database system and a consumer consuming data from the second database system, the method being executed by one or more processors and comprising:
providing, by a deploy tool, one or more source-side clone data components in the first database system, each source-side clone data component being a copy of a respective data component;
defining, by the deploy tool, a source-side green access schema in the first database system, the source-side green access schema providing one or more views to the one or more source-side clone data components based on the second version of the application;
providing, by a replication system and based on one or more statements received from the deploy tool, one or more consumer-side clone data components in the second database system, each consumer-side clone data component being a copy of a respective data component;
defining, by a replication system and based on one or more statements received from the deploy tool, a consumer-side green access schema in the second database system, the consumer-side green access schema providing one or more views to the one or more consumer-side clone data components based on the second version of the application;
during execution of the upgrade:
replicating, by a first handler of the replication system, data from at least one source-side data component to a respective consumer-side component, the first handler corresponding to the first version of the application; and
after completion of the upgrade:
replicating, by a second handler of the replication system, data from at least one source-side data component to a respective consumer-side component, the second handler corresponding to the second version of the application.

2. The method of claim 1, further comprising, after completion of the upgrade:
switching an upgraded version of the application to the source-side green access schema for interacting with the one or more source-side clone data components; and
removing a source-side blue access schema, through which a previous version of the application accessed data in the first database system.

3. The method of claim 1, further comprising, after completion of the upgrade:
switching replication of data from the first database system to the consumer-side green access schema; and
removing a consumer-side blue access schema, through which data was replicated to in the second database system.

4. The method of claim 3, wherein the replication system triggers switching of replication of data, and removing the consumer-side blue access schema based on post-upgrade statements received from the deploy tool.

5. The method of claim 1, wherein the source-side green access schema comprises a replication trigger for replicating data to the second database system.

6. The method of claim 1, wherein a data schema of the first database system comprises a trigger for copying data from an original clone data component to at least one source-side data component.

7. The method of claim 1, wherein the one or more source-side data components comprise one or more of a clone column, and a clone table.

8. A non-transitory computer-readable storage medium coupled to one or more processors and having instructions stored thereon which, when executed by the one or more processors, cause the one or more processors to perform operations for replication of data from a first database system to a second database system during upgrade of an application from a first version to a second version, the application interacting with the data in the first database system and a consumer consuming data from the second database system, the operations comprising:
providing, by a deploy tool, one or more source-side clone data components in the first database system, each source-side clone data component being a copy of a respective data component;
defining, by the deploy tool, a source-side green access schema in the first database system, the source-side green access schema providing one or more views to the one or more source-side clone data components based on the second version of the application;
providing, by a replication system and based on one or more statements received from the deploy tool, one or more consumer-side clone data components in the second database system, each consumer-side clone data component being a copy of a respective data component;
defining, by a replication system and based on one or more statements received from the deploy tool, a consumer-side green access schema in the second database system, the consumer-side green access schema providing one or more views to the one or more consumer-side clone data components based on the second version of the application;
during execution of the upgrade:
replicating, by a first handler of the replication system, data from at least one source-side data component to a respective consumer-side component, the first handler corresponding to the first version of the application; and
after completion of the upgrade:
replicating, by a second handler of the replication system, data from at least one source-side data component to a respective consumer-side component, the second handler corresponding to the second version of the application.

9. The computer-readable storage medium of claim 8, wherein operations further comprise, after completion of the upgrade:
switching an upgraded version of the application to the source-side green access schema for interacting with the one or more source-side clone data components; and
removing a source-side blue access schema, through which a previous version of the application accessed data in the first database system.

10. The computer-readable storage medium of claim 8, wherein operations further comprise, after completion of the upgrade:

switching replication of data from the first database system to the consumer-side green access schema; and
removing a consumer-side blue access schema, through which data was replicated to in the second database system.

11. The computer-readable storage medium of claim 10, wherein the replication system triggers switching of replication of data, and removing the consumer-side blue access schema based on post-upgrade statements received from the deploy tool.

12. The computer-readable storage medium of claim 8, wherein the source-side green access schema comprises a replication trigger for replicating data to the second database system.

13. The computer-readable storage medium of claim 8, wherein a data schema of the first database system comprises a trigger for copying data from an original clone data component to at least one source-side data component.

14. The computer-readable storage medium of claim 8, wherein the one or more source-side data components comprise one or more of a clone column, and a clone table.

15. A system, comprising:
a computing device; and
a computer-readable storage device coupled to the computing device and having instructions stored thereon which, when executed by the computing device, cause the computing device to perform operations for replication of data from a first database system to a second database system during upgrade of an application from a first version to a second version, the application interacting with the data in the first database system and a consumer consuming data from the second database system, the operations comprising:
providing, by a deploy tool, one or more source-side clone data components in the first database system, each source-side clone data component being a copy of a respective data component;
defining, by the deploy tool, a source-side green access schema in the first database system, the source-side green access schema providing one or more views to the one or more source-side clone data components based on the second version of the application;
providing, by a replication system and based on one or more statements received from the deploy tool, one or more consumer-side clone data components in the second database system, each consumer-side clone data component being a copy of a respective data component;
defining, by a replication system and based on one or more statements received from the deploy tool, a consumer-side green access schema in the second database system, the consumer-side green access schema providing one or more views to the one or more consumer-side clone data components based on the second version of the application;
during execution of the upgrade:
replicating, by a first handler of the replication system, data from at least one source-side data component to a respective consumer-side component, the first handler corresponding to the first version of the application; and
after completion of the upgrade:
replicating, by a second handler of the replication system, data from at least one source-side data component to a respective consumer-side component, the second handler corresponding to the second version of the application.

16. The system of claim 15, wherein operations further comprise, after completion of the upgrade:
switching an upgraded version of the application to the source-side green access schema for interacting with the one or more source-side clone data components; and
removing a source-side blue access schema, through which a previous version of the application accessed data in the first database system.

17. The system of claim 15, wherein operations further comprise, after completion of the upgrade:
switching replication of data from the first database system to the consumer-side green access schema; and
removing a consumer-side blue access schema, through which data was replicated to in the second database system.

18. The system of claim 17, wherein the replication system triggers switching of replication of data, and removing the consumer-side blue access schema based on post-upgrade statements received from the deploy tool.

19. The system of claim 15, wherein the source-side green access schema comprises a replication trigger for replicating data to the second database system.

20. The system of claim 15, wherein a data schema of the first database system comprises a trigger for copying data from an original clone data component to at least one source-side data component.

* * * * *